US009098819B1

(12) United States Patent
Korula et al.

(10) Patent No.: US 9,098,819 B1
(45) Date of Patent: Aug. 4, 2015

(54) IDENTIFYING SOCIAL NETWORK ACCOUNTS BELONGING TO THE SAME USER

(71) Applicant: Google Inc., Mountain View, CA (US)

(72) Inventors: Nitish Korula, New York, NY (US); Silvio Lattanzi, Mountain View, CA (US); Ming Xiong, Mountain View, CA (US)

(73) Assignee: Google Inc., Mountain View, CA (US)

( * ) Notice: Subject to any disclaimer, the term of this patent is extended or adjusted under 35 U.S.C. 154(b) by 209 days.

(21) Appl. No.: 13/654,589

(22) Filed: Oct. 18, 2012

(51) Int. Cl.
G06F 15/16 (2006.01)
G06Q 10/06 (2012.01)
G06Q 40/08 (2012.01)
G06F 17/30 (2006.01)
G06Q 10/10 (2012.01)

(52) U.S. Cl.
CPC ...... *G06Q 10/0635* (2013.01); *G06F 17/30864* (2013.01); *G06Q 10/06* (2013.01); *G06Q 40/08* (2013.01); *G06Q 10/10* (2013.01)

(58) Field of Classification Search
USPC ............ 709/204; 705/7.28; 707/999.107, 771
See application file for complete search history.

(56) References Cited

U.S. PATENT DOCUMENTS

| 6,130,938 | A | 10/2000 | Erb |
|---|---|---|---|
| 6,192,119 | B1 | 2/2001 | Wilson |
| 6,697,478 | B1 | 2/2004 | Meldrum et al. |
| 6,754,322 | B1 | 6/2004 | Bushnell |
| 7,106,848 | B1 | 9/2006 | Barlow et al. |
| 7,366,990 | B2 | 4/2008 | Pitroda |
| 7,555,110 | B2 | 6/2009 | Dolan et al. |
| 7,610,287 | B1 | 10/2009 | Dean et al. |
| 7,742,468 | B2 | 6/2010 | Vagelos |
| 2002/0137490 | A1 | 9/2002 | Gallant |
| 2002/0143874 | A1 | 10/2002 | Marquette et al. |
| 2004/0258220 | A1 | 12/2004 | Levine et al. |
| 2005/0152521 | A1 | 7/2005 | Liljestrand |
| 2006/0026288 | A1 | 2/2006 | Acharya et al. |
| 2006/0077957 | A1 | 4/2006 | Reddy et al. |
| 2006/0206604 | A1 | 9/2006 | O'Neil et al. |
| 2007/0127631 | A1 | 6/2007 | Difiglia |
| 2007/0171898 | A1 | 7/2007 | Salva |
| 2007/0173236 | A1 | 7/2007 | Vishwanathan et al. |
| 2007/0248077 | A1 | 10/2007 | Mahle, Jr. et al. |

(Continued)

FOREIGN PATENT DOCUMENTS

WO WO02079984 10/2002

OTHER PUBLICATIONS

Adamic et al., "A Social Network Caught in the Web," Internet Journal, First Monday, Jun. 2, 2003, vol. 8, No. 6, pp. 1-22.

(Continued)

*Primary Examiner* — Kyung H Shin
(74) *Attorney, Agent, or Firm* — Patent Law Works LLP

(57) ABSTRACT

A system and method for determining matching pairs between social networks is disclosed. The system comprises a matching module that includes an account retrieval engine, candidate pairing module, a match determination module, a social network engine, a personalizing engine and a graphical user interface engine. The candidate pairing module generates candidate pairs of accounts from different social networks that may represent the same user. The match pairing module generates scores for the pairs. The match determination module determines a subset of the pairs that most likely represent the same users.

20 Claims, 10 Drawing Sheets

(56) References Cited

U.S. PATENT DOCUMENTS

| | | | |
|---|---|---|---|
| 2008/0056475 | A1 | 3/2008 | Brannick et al. |
| 2008/0192656 | A1 | 8/2008 | Vagelos |
| 2009/0055435 | A1* | 2/2009 | Kiviluoto et al. .......... 707/104.1 |
| 2011/0098156 | A1 | 4/2011 | Ng et al. |
| 2013/0024239 | A1* | 1/2013 | Baker et al. .................. 705/7.28 |
| 2013/0191416 | A1* | 7/2013 | Lee et al. ..................... 707/771 |

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.
Anwar et al., "Leveraging 'Social-Network' Infrastructure to Improve Peer-to Peer Overlay Performance: Results from Orkut," University of Illinois at Urbana-Champaign USA, 2005, 9 pgs.
AT&T Personal Reach Service: Benefits and Features, Mar. 29, 2010, 7 pgs.
AT&T Personal Reach Service: Personal Reach Service, Mar. 29, 2010, 2 pgs.
Baird et al., "Neomillennial User Experience Design Strategies: Utilizing Social Networking Media to Support "Always on" Learning Styles," J. Educational Technology Systems, vol. 34(1), 2005-2006, Baywood Publishing Co., Inc., pp. 5-32.
Boyd, et al., "Social Network Sites: Definition, History, and Scholarship," Journal of Computer-Mediated Communication, International Communication Association, 2008, pp. 210-230.
Churchill et al., "Social Networks and Social Networking," IEEE Computer Society, Sep.-Oct. 2005, pp. 14-19.
Cohen et al., "Social Networks for Creative Collaboration," C&C '05, Apr. 12-15, 2005, London, United Kingdom, pp. 252-255.
Decker et al., "The Social Semantic Desktop," Digital Enterprise Research Institute, DERI Galway, Ireland, DERI Innsbruck, Austria, DERI Technical Report, May 2, 2004, 7 pgs.
Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.
Eagle et al., "Social Serendipity: Proximity Sensing and Cueing," MIT Media Laboratory Technical Note 580, May 2004, 18 pgs.
Erickson et al., "Social Translucence: Using Minimalist Visualizations of Social Activity to Support Collective Interaction," Designing Information Spaces: The Social Navigation Approach, Springer-verlag: London, 2003, pp. 1-19.
Gross et al., "Information Revelation and Privacy in Online Social Networks," WPES '05, Alexandria, Virginia, Nov. 7, 2005, pp. 71-80.
Hammond et al., "Social Bookmarking Tools (I)," D-Lib Magazine, Apr. 2005, vol. II, No. 4, ISSN 1082-9873, 23 pgs.
Heer et al., "Vizster: Visualizing Online Social Networks," University of California, Berkeley, Oct. 23, 2005, 8 pgs.
International Search Report, International Application No. PCT/US2008/005118, Sep. 30, 2008, 2 pgs.
Leonard, "You Are Who You Know," Internet, retrieved at http://www.salon.com, Jun. 15, 2004, 15 pgs.
LiveJournal, "FAQ #163: How Do I Find a Syndicated Account?" Last Updated: thebubba, Jan. 6, 2004, 2 pgs.
Marwick, "Selling Your Self: Online Identity in the Age of a Commodified Internet," University of Washington, 2005, 192 pgs.
MediaSift Ltd., DataSift: Realtime Social Data Mining Platform, Curate and Data Mine the Real Time Web with DataSift, Dedipower, Managed Hosting, [Retrieved on May 13, 2011], 1 pg.
Metcalf et al., "Spatial Dynamics of Social Network Evolution," 23rd International Conference of the System Dynamics Society, Jul. 19, 2005, pp. 1-13.
Mori et al., "Real-world Oriented Information Sharing Using Social Networks," Group '05, Sanibel Island, Florida, USA, Nov. 6-9, 2005, pp. 81-84.
Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.
Neumann et al., "Semantic social network portal for collaborative online communities," Journal of European Industrial Training, 2005, Emerald Group Publishing, Limited, vol. 29, No. 6, pp. 472-487.
O'Murchu et al., "Online Social and Business Networking Communities," Digital Enterprise Research Institute DERI Technical Report, National University of Ireland, Aug. 11, 2004, 22 pgs.
Ring Central, Inc., Internet, retrieved at http://www.ringcentral.com, Apr. 19, 2007, 1 pg.
Singh et al., "Cinema: Columbia InterNet Extensible Multimedia Architecture," Department of Computer Science, Columbia University, May 2002, pp. 1-83.
Steen et al., "Development of we-centric, context-aware, adaptive mobile services requires empathy and dialogue," Freeband FRUX, Oct. 17, 2005, Internet Journal, Netherlands, pp. 1-4.
Superfeedr Track, Internet, retrieved at http://blog.superfeedr.com/track/filter/xmpp/pubsubhubbub/track, May 13, 2011, 8 pgs.
Twitter Blog: Tracking Twitter, Internet, retrieved at http://blog.twitter.com/2007/09/tracking-twitter.html, May 13, 2011, 2 pgs.
Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.
Van Eijk et al., "We-centric, context-aware, adaptive mobile service bundles," Freeband, Telematica Instituut, TNO telecom, Nov. 30, 2004, 48 pgs.
Wenger et al., "Technology for Communities," CEFRIO Book Chapter v 5.2, Jan. 18, 2005, pp. 1-15.
Narayanan et al., De-anonymizing Social Networks,Security and Privacy, 2009 30th IEEE Symposium on , vol., No., pp. 173-187, May 17-20, 2009.
Henderson et. al., "It's who you know: graph mining using recursive structural features." In Proceedings of the 17th ACM SIGKDD international conference on Knowledge discovery and data mining, pp. 663-671. 2011.

* cited by examiner

IDENTIFYING SOCIAL NETWORK ACCOUNTS BELONGING TO THE SAME USER

BACKGROUND

The specification relates to identifying social network accounts belonging to the same user. In particular, the specification relates to using known social network accounts to identify additional social network accounts associated with the same user.

Many users choose to have accounts on multiple social networks. Many social networks provide a feature to the user for explicitly connecting one account on a social network to another account on another social network. By connecting the accounts, the user increases the social circle of each account and an enhanced user experience may be provided to the user. However, many users do not connect their accounts on social networks, for example, because they are new to a social network or are unaware that there is a mechanism for connecting their accounts. Thus, the enhanced user experience may not be provided to the users who do not have their accounts connected.

SUMMARY

In general, one innovative aspect of the subject matter described in this disclosure may be embodied in methods that include receiving social data associated with a first user from a first social network and from a second social network, the social data including the first user's contacts and known matching pairs between the first and second social network, generating first candidate pairs from the contacts and the known matching pairs, determining a first score for each of the first candidate pairs, determining matching accounts from the first candidate pairs based on the first score, adding the matching accounts to the known matching pairs, generating second candidate pairs from the contacts and the known matching pairs, determining a second score for each of the second candidate pairs, determining matching accounts from the second candidate pairs based on the second score and adding the matching accounts to the known matching pairs until a number of matching accounts falls below a threshold.

These and other implementations may each optionally include one or more of the following features. For instance, the operations further include: subsequent to adding the matching accounts to the known pairs, performing the generating of the first candidate pairs, determining the score, determining the matching accounts and adding the matching accounts to the known matching pairs until a number of matching accounts falls below a threshold. In another instance, the operations include: generating a first set of pairs for the first social network that is uniquely identified by a first contact identifier for each contact, generating a second set of pairs for the second social network that is uniquely identified by a second contact identifier for each contact, joining account identifiers from the known matching pairs with the first contact identifiers from the first set of pairs to form a first joined result, joining account identifiers from the known matching pairs with the second contact identifiers from the second set of pairs to form a second joined result, merging the first joined result with the second joined result to form a set of quadruplets and identifying the candidate pairs from the set of quadruplets. In another instance, generating the first candidate pairs further comprises: generating a first set of pairs by pairing a first account identifier from the first social network with first contact identifiers from the second social network, for each pair in the first set of pairs, generating a second set of pairs by pairing a second account identifier for the second user in the pair from the second social network with second contact identifiers from the first social network and generating candidate pairs by grouping the set of pairs according to account identifiers for the second social network.

In other instances, determining the matching account further comprises: for each second social network account, identifying the candidate pairs containing a first social network account and selecting a top N highest scored first candidate pairs, discarding all the other first candidate pairs containing the second social network account, for each first social network account identifying the remaining first candidate pairs containing the second social network account and selecting the top N highest scored first candidate pairs. In other instances, determining the matching account further comprises: constructing a bipartite graph with nodes representing first social network accounts on a first side and second social network accounts on a second side, computing a maximum weight bipartite matching in the graph and identifying edges resulting from the maximum weight as known matching accounts.

In another instance, the operations further include: identifying that the first user is connected to a second user in the first social network and generating a suggestion for the first user to create a connection with the second user in the second social network based on the known matching pairs. In other instances, the operations further include generating a suggestion for the first user associated with the first social network to associate the second social network with the first social network. In other instances, the operations further include receiving a query associated with a first user from a server, retrieving search results from other users that are connected to the first user in the first and second social networks and transmitting the search results to the server, wherein the server associates the search results with content generated by the server. In some instances, the search results are webpages that match the query. In other instances, the features further include the social data including user profile information for each candidate and wherein the score is based on a similarity of user profile information in the first and second social networks.

The subject matter described in this disclosure advantageously provides methods and systems for identifying accounts of different social networks that belong to the same users. The identified accounts may be used in a suggestion for connecting the accounts. Also, with more connections known between the social networks, a user searching for content may be provided with more relevant content that friends provide on the social networks.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

A system and method for identifying social network accounts belonging to the same user are described below.

Figure 1:
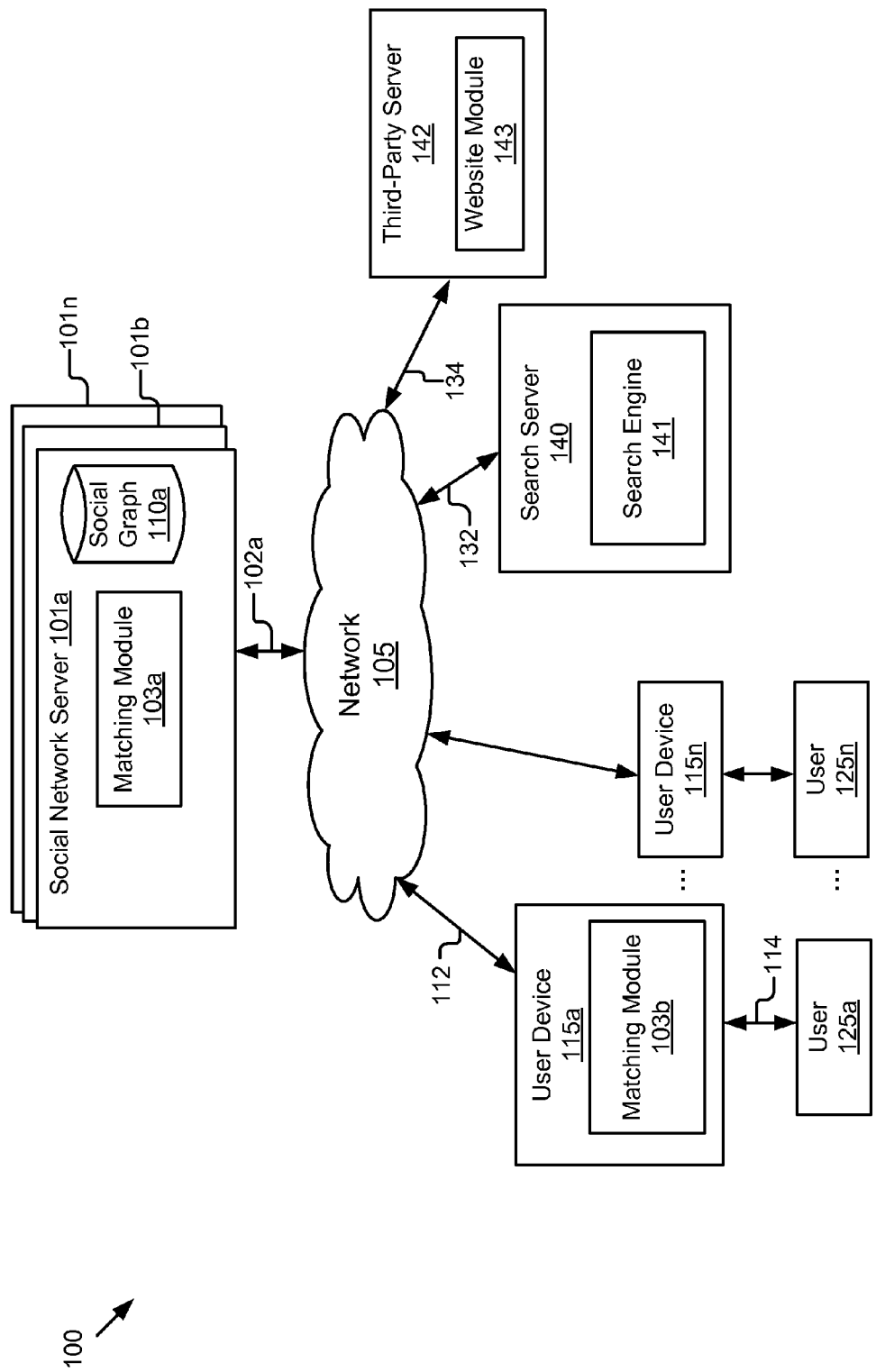
FIG. 1 is a block diagram illustrating an example of a system for identifying social network accounts belonging to the same user.

FIG. 1 illustrates a block diagram of a system 100 for identifying social network accounts belonging to the same user according to some examples. The illustrated description of the system 100 includes user devices 115a . . . 115n that are accessed by users 125a . . . 125n, one or more social network servers 101a, 101b, through 101n, a search server 140 and a third-party server 142. In the illustrated implementation, these entities are communicatively coupled via a network 105. In FIG. 1 and the remaining figures, a letter after a reference number, such as "115a" is a reference to the element having that particular reference number. A reference number in the text without a following letter, such as "115," is a general reference to any or all instances of the element bearing that reference number.

The network 105 can be a conventional type, wired or wireless, and may have any number of configurations such as a star configuration, token ring configuration or other configurations. In some instances, the network 105 is any type of data network. For example, the network may be a 3G or 4G network. Furthermore, the network 105 may include a local area network (LAN), a wide area network (WAN) (e.g., the Internet), and/or any other interconnected data path across which multiple devices may communicate. In some instances, the network 105 may be a peer-to-peer network. The network 105 may also be coupled to or includes portions of a telecommunications network for sending data in a variety of different communication protocols. In some instances, the network 105 includes Bluetooth communication networks or a cellular communications network for sending and receiving data such as via short messaging service (SMS), multimedia messaging service (MMS), hypertext transfer protocol (HTTP), direct data connection, WAP, email, etc. In some instances, the network 105 can be a combination of one or more of the different network types described above.

The social network server 101a is coupled to the network 105 via signal line 102a and comprises a matching module 103a and storage for a social graph 110a. The matching module 103a maintains a social network on the social network server 101a, identifies social network accounts for a user stored on other social network servers 101b, 101n and performs actions in response to the identification, such as suggesting that the user's connections follow the user on the other social networks. The social network may be representative of one social network or there may be multiple social networks coupled to the network 105, each having its own social network server 101 and social graph 110. For example, a first social network can be directed to business networking, a second social network can be centered on academics, a third social network can be directed to dating, etc. A social network is any type of social structure where the users are connected by a common feature. The common feature includes friendship, family, work, an interest, etc. Other examples of a social network may include photo websites, blog feeders, blogs, micro-blogs, personal websites, forums and rating websites.

The social graph 110a is a mapping of all users, for example, users 125a . . . 125n, in a social network and how they are related to each other. Additionally, a social graph 110a may define links between an account on a first social network and an account on a second social network. The links may be explicitly generated to indicate that the two accounts represent the same user 125n. For example, users 125a . . . 125n may have accounts for any number of social networks provided by social network servers 101a . . . 101n. A user 125a that has an account for a first social network may provide information to the first social network that the user 125a also has another account on a second social network. The information may include user or account identification information, a uniform resource locator and/or social network name (for example, a handle). A social network application 107a may store the information in social graph 110a or as part of a user profile.

The user devices 115a . . . 115n in FIG. 1 are used by way of example. While FIG. 1 illustrates two user devices 115a . . . 115n, the disclosure applies to any system architecture having one or more user devices 115a . . . 115n. Furthermore, while only one network 105 is coupled to the user devices 115, the social network servers 101a-101n, the search server 140 and the third-party server 142, in practice any number of networks 105 can be connected to the entities. Additionally, while only one search server 140 and third-party server 142 are shown, the system 100 could include multiple search servers 140 and third-party servers 142.

In some instances, at least a part of the matching module 103b may be stored on a user device 115a, which is connected to the network 105 via signal line 112. For example, the matching module 103b can be a thin-client application that retrieves information from the matching module 103a on the social network server 101a and displays the information on the user device 115a. The user 125a interacts with the user device 115a via signal line 114. The user device 115a . . . 115n is any computing device. For example, the user device 115a . . . 115n can be a personal computer ("PC"), a cell phone (e.g., a smart phone, a feature phone, etc.), a tablet computer (or tablet PC), a laptop, etc. In some instances, the user device 115a . . . 115n is a smart phone having a touch screen and the user 125a . . . 125n interacts with the smart phone via the touch screen.

The search server 140 is connected to the network 105 via signal line 132 and includes a search engine 141 for indexing multiple sources of content. For example, the search engine 141 includes indices for web pages, images, information and other types of files present on the Internet. The search engine 141 collects, parses and stores data to facilitate information retrieval. The search engine 141 receives a search query and returns search results that match the search query. In some instances where the users consent to the use of such data, the search engine 141 incorporates information from the matching module 103a into the search results. For example, the matching module 103a on the social network server 101a includes an application programming interface (API) for transmitting social network account information in response to a request from the search engine 141 stored on the search server 140. The search engine 141 queries the matching module 103a for social network account information to include in search results. For example, a first user submits a search query to the search engine 141. The search engine 141 retrieves search results that match the search query. The search engine 141 also queries the matching module 103a for social network account information that matches the first user's search query, for example, posts made by users that share a first-degree connection with the first user. The search engine 141 combines the social network account information with the search results so that the first user can see subject to the other users' consent, for example, whether other users in the social network approve of a website, have checked-in at a particular location, have posted images of an activity, etc.

A third-party server 142, which is connected to the network 105 via signal line 134 is a computing device or system for providing various computing functionalities, services, and/or resources to the other entities of the system 100. In one instance, the third-party server 142 may be a server hosting a website module 143 operable to provide the computing functionalities, services, and/or resources, and to send data to and receive data from the other entities of the network 105. For example, the website module 143 generates a website on a topic, including for media distribution (e.g. video, music, etc.), business services, news or any combination of the foregoing services. In some instances, the website module 143 may be an electronic encyclopedia that receives a search query and returns results in the electronic encyclopedia. In instances where the user consents to the use of such data, the website module 143 incorporates the social network account information into the website. For example, with regard to the encyclopedia example above, the website module 143 receives a request from a first user for an entry about container gardening. The website module 143 queries the matching module 103a to receive information about a second user that is connected with the first user that wrote a micro-blog post about her container garden. The matching module 103a provides the information to the website module 143, which incorporates the information into the website, for example, by including the name of the second user and an excerpt of the micro-blog post on the website.

The matching module 103 is code and routines for identifying social network accounts belonging to the same user 125. In some instances, the matching module 103 is implemented using hardware such as a field-programmable gate array (FPGA) or an application-specific integrated circuit (ASIC). In other instances, the matching module 103 may be implemented using a combination of hardware and software. The matching module 103 is described below in more detail with reference to FIGS. 2-6B.

Figure 2:
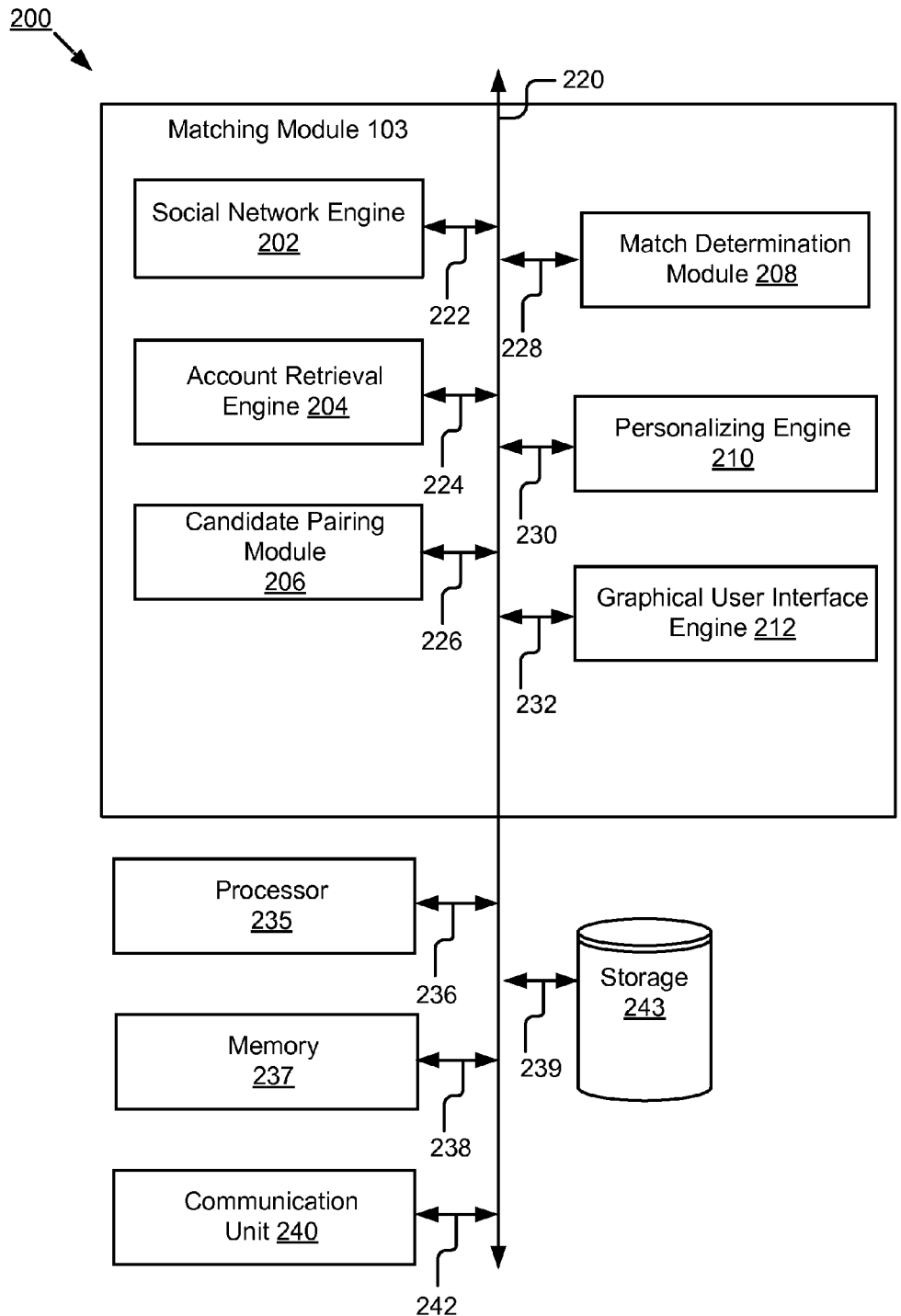
FIG. 2 is a block diagram illustrating an example of a matching module.

Referring now to FIG. 2, the matching module 103 is shown in more detail. FIG. 2 is a block diagram of a computing device 200 that includes the matching module 103, a processor 235, a memory 237, a communication unit 240 and storage 243. In one instance, the computing device 200 is a social network server 101. In other instances, the computing device 200 is a user device 115, a search server 140 or a third-party server 142.

The processor 235 comprises an arithmetic logic unit, a microprocessor, a general purpose controller or some other processor array to perform computations and provide electronic display signals to a display device. The processor 235 is coupled to the bus 220 for communication with the other components via signal line 236. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 237 stores instructions and/or data that may be executed by processor 235. The memory 237 is coupled to the bus 220 for communication with the other components via signal line 238. The instructions and/or data may comprise code for performing any and/or all of the techniques described herein. The memory 237 may be a dynamic random access memory (DRAM) device, a static random access memory (SRAM) device, flash memory or some other memory device known in the art. In one instance, the memory 237 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 240 receives data from the user devices 115, the search server 140, the third-party server 142 and/or the social network server 101 depending upon where the matching module 103 is stored. The communication unit 240 transmits the data to the matching module 103. The communication unit 240 is coupled to the bus 220 via signal line 242. In one instance, the communication unit 240 includes a port for direct physical connection to the network 105 or to another communication channel. For example, the communication unit 240 includes a USB, SD, CAT-5 or similar port for wired communication with the network 105. In another instance, the communication unit 240 includes a wireless transceiver for exchanging data with the network 105, or with another communication channel, using one or more wireless communication methods, such as IEEE 802.11, IEEE 802.16, BLUETOOTH®, near field communication (NFC) or another suitable wireless communication method. In one instance, the communication unit 240 includes a NFC chip that generates a radio frequency (RF) for short-range communication.

The storage device 243 stores instructions and/or data that may be executed by the processor 235. For example, the storage device 243 stores content data, the social graph 110 and profile data including information that links a plurality of first accounts of a first social network to a plurality of second accounts of a second social network. The storage device 243 is communicatively coupled by the bus 220 for communication with the other components of the computing device 200 via signal line 239.

In the illustrated implementation, the matching module 103 includes a social network engine 202, an account retrieval engine 204, a candidate pairing module 206, a match determination module 208, a personalizing engine 210 and a graphical user interface engine 212.

The social network engine 202 may be software including routines for generating and managing a social network. In some instances, the social network engine 202 can be a set of instructions executable by the processor 235 to provide the functionality described below for generating a social network. In other instances, the social network engine 202 may be stored in the memory 237 of the computing device 200 and is accessible and executable by the processor 235. The social network engine 202 may be adapted for cooperation and communication with the processor 235 and other components of the computing device 200 via signal line 222.

In some instances, the social network engine 202 manages registration of users, creation of a user profile and creation of a social graph 110 that may be stored in the storage 243. The social network engine 202 also manages the association of different actions with the user profile including the publication of posts (e.g. text, links or media) to a selected audience, the publication of comments, indications of acknowledgement (e.g. approval or disapproval), uploading of media (e.g. photos, videos, etc.), check-ins to different locations and other actions associated with a social network.

The account retrieval engine 204 may be software including routines for retrieving social data from a given social network. In one instance, the account retrieval engine 204 may be a set of instructions executable by the processor 235 to provide the functionality described below for retrieving social data. In some instances, the account retrieval engine 204 can be stored in the memory 237 of the computing device 200 and may be accessible and executable by the processor 235. The account retrieval engine 204 may be adapted for cooperation and communication with the processor 235 and other components of the computing device 200 via signal line 224.

In some instances, the account retrieval engine 204 requests social data from one or more social network servers 101. In some instances the social data is publicly available information. In some instances, the user consents to the user of such data being retrieved. The social data includes any type of account information from the social networks. For example, the account information includes full user names (including synonyms or nicknames for matching), account names, a list of contacts for users in each social network, social graphs 110 and known matches between social networks. A known match includes explicit links (e.g. ME links) provided by users and matches made where the accounts have the same name. The explicit links are identified where a user in a first social network adds a link to the user's user profile that references the user's identity in a second social network.

In one instance, the matching module 103*a* may be stored on a social network server 101*a* and the account retrieval engine 204 retrieves the social data from the storage. In a same instance, the account retrieval engine 204 retrieves other social data from another social network server 101. In some instances, the account retrieval engine 204 stores the received social data in storage 243. In other instances, the account retrieval engine 204 transmits the social data to the candidate pairing module 206 for processing.

In some instances, the request and retrieval of social data may be performed by using the application programming interface (API). The social network engine 202 may provide a web service or API to provide the information that may be stored on social network server 101 to the matching module 103. In some instances, the social data can be provided in an Extensible Markup Language (XML), JavaScript Object Notation (JSON) or Comma-Separated Values (CSV) format.

The candidate pairing module 206 may be software including routines for pairing social network accounts from different social networks that may represent the same user 125. In one instance, the candidate pairing module 206 may be a set of instructions executable by the processor 235 to provide the functionality described below for generating a set of candidate pairs between social networks. In some instances, the candidate pairing module 206 can be stored in the memory 237 of the computing device 200 and may be accessible and executable by the processor 235. The candidate pairing module 206 may be adapted for cooperation and communication with the processor 235 and other components of the computing device 200 via signal line 226.

The candidate pairing module 206 receives social data for generating candidate pairs between the social networks. In some instances, the user consents to the use of such data for generating the candidate pairs. In one instance, the candidate pairing module 206 receives a full user name, an account name and contacts associated with a user from the account retrieval engine 204. In other instances, the candidate pairing module 206 retrieves one or more social graphs 110 from the storage 243. Additionally, the candidate pairing module 206 receives known matching pairs that exist between the social networks or the candidate pairing module 206 extracts the information from a social graph. Each pair in the known matching pairs may include identifiers that identify the user 125 in each social network.

The candidate pairing module 206 may use different algorithms to generate candidate pairs. In one instance, the candidate pairing module 206 generates candidate pairs by matching every account in a first social network with every account in a second social network. In some instances, the candidate pairing module 206 uses an algorithm that determines candidate pairs based on the relationships in each social network and known matching pairs that exist between the social networks.

For example, the candidate pairing module 206 generates a first set of candidate pairs for at least one account that is identified by a first contact identifier for each contact. A candidate pair in the first set includes user information for the at least one account and contact information for the contact. For example, the user information may include an identification number or name, a user name, a full name and/or a nickname for the at least one account. The contact information may include an identification number or name for the contact. The candidate pairing module 206 generates a second set of candidate pairs that is identified by a second contact identifier for each contact. Similar to the first set, a pair includes user information for the at least one account in the second social graph and contact information. The contact information may include an identification number or name for the contact.

The candidate pairing module 206 generates the candidate pairs by merging the known matching pairs and the first and second set of pairs. In one instance, merging includes performing a join on known matching pairs and the first and second sets to determine known matching pairs that have a matching contact in the first set and have a matching contact in the second set. The merge may generate results that include the known matching pair, user information for a user in the first social network and user information for a user in the second social network. The candidate pairs include user information for each of the social networks. As used in the specification, a contact of a user may be another user with whom the user has at least one relationship or affinity that is known by a system. An affinity between a first user and a second user may be data describing a degree of closeness between the first user and the second user. For example, an affinity indicates that a first user and a second user have a close relationship because they follow each other in a social network. In some instances, one or more other users may be connected to the first user. For example, the one or more users can be friends of the first user. In another example, users can belong to the same group.

In another example, the candidate pairing module 206 may use another algorithm that generates a set of pairs by associating contacts of known matching pairs between social networks. In one instance, the candidate pairing module 206 generates a first set of pairs by pairing known matching accounts from a first social network with contacts of the known matching account of the second social network. The candidate pairing module 206 generates a second set of pairs by pairing each contact of the second social network in the first set of pairs with each contact of the paired account from the first social network in the first set of pairs. The candidate pairing module 206 groups the second set of pairs by particular accounts of one of the social networks. The candidate pairing module 206 generates candidate pairs by selecting one or more pairs from each group. In some instances, the candidate pairs may include pairs that appear frequently in the group. For example, a particular pair may have a number of copies in the group above a predetermined threshold. In some instances, pairs that appear infrequently are deleted or not considered as candidate pairs.

In one instance, the candidate pairing module 206 stores the candidate pairs in storage 243. In other instances, the candidate pairing module 206 sends the candidate pairs to the pair scoring module 210 for scoring the candidate pairs.

The match determination module 208 may be software including routines for determining a subset of the candidate pairs that most likely represents the same user 125. In one instance, the match determination module 208 may be a set of instructions executable by the processor 235 to provide the functionality described below for determining the candidate pairs that most likely represent the same user 125. In some instances, the match determination module 208 can be stored in the memory 237 of the computing device 200 and may be accessible and executable by the processor 235. The match determination module 208 may be adapted for cooperation and communication with the processor 235 and other components of the computing device 200 via signal line 228.

In one instance, the match determination module 208 receives the candidate pairs from the candidate pairing module 206. In another instance, the match determination module 208 retrieves the candidate pairs from storage 243.

The match determination module 208 generates a score for the candidate pairs. In one instance, the match determination module 208 scores a pair by comparing user information of each account in the pair. The score for a pair may be based on having similar names including a full name, user name, account name or nicknames. The score may also be based on comparing the contacts associated with each account in the pair. In one instance, the match determination module 208 determines that contacts match based on matching names of the contacts. In other instances, the match determination module 208 determines that contacts match based on the explicit links. In some embodiments, each candidate has a user profile that includes information, such as employers, schools, geographic locations, etc. The match determination module 208 compares the user profiles for the contacts in each social network and generates a score based on the similarity of the user profile information. In some other embodiments, the match determination module 208 compares the similarity of other information for contacts in the social network, for example, the users can post similar status updates and photos to the different social networks. This can include when a user links a first social network with a second social network such that posts from the first social network are automatically published on the second social network. The match determination module 208 may generate a higher score for matches based on explicit links than matches based on similar names.

In some instances, for each second social network account, the matching determination module 208 identifies the candidate pairs containing a first social network account and selects the top N highest scored candidate pairs. In one instance, N may be a small number, for example, three or less. The match determination module 208 may discard the candidate pairs that are not top-ranked candidate pairs. For each account of the first social network, the match determination module 208 identifies the remaining candidate pairs containing the second social network and selects the top N highest scored candidate pairs.

In another instance, the match determination module 208 generates a bipartite graph for the accounts in the candidate pairs. On one side of the graph, nodes represent accounts of a first social network. On the other side, nodes represent accounts of a second social network. Edges between nodes on each side include a value or weight that is a score for the pair. The match determination module 208 computes a maximum weight bipartite matching in the graph. The maximum weight bipartite matching includes edges that form the matching pairs.

In one instance, the match determination module 208 may store the matching pairs in storage 243. In other instances, the match determination module 208 updates the known matches by adding the matching pairs to the known matches. In one instance, the match determination module 208 may repeat the process of finding matching pairs to find more matches between the social networks. The request may include the new version of the known matching pairs. In one instance, the match determination module 208 repeats the process based on additional high-quality results for the candidate pairs that are determined to be matching pairs. For example, the match determination module 208 generates the request based on at least one of the scores being above a scoring threshold. In another example, match determination module 206 generates the request based on an average or mean of the scores being above a threshold. In other instances, the match determination module 20 86 sends the matching pairs to the graphical user interface engine 212 for displaying the matching pairs or information related to the matching pairs. In another instance, the match determination module 208 sends the matching pairs to the graphical user interface 212 for suggesting that a user 125 connect or link accounts between social networks.

In other instances, the match determination module 208 generates a suggestion to create a connection between a first user and a second user based on the matching accounts. In this way, users having accounts and a social affinity on a first social network may have the opportunity to connect on a second social network. The users may not be connected on the second social network for many reasons. For example, one of the users may be a new user on the second social network. In another example, at least one of the users may have an ambiguous handle or name that is not easily recognizable to other users.

The personalizing engine 210 may be software including routines for allowing online services providers to retrieve personalized results for a user interacting on the online services. In some instances, the personalizing engine 210 can be a set of instructions executable by the processor 235 to provide the functionality below for generating personalized results. In other instances, the personalizing engine 210 may be stored in the memory 237 of the computing device 200 and is accessible and executable by the processor 235. The personalizing engine 210 may be adapted for cooperation and communication with the processor 235 and other components of the computing device 200 via signal line 230.

In instances where the matching module 103 is stored on the social network server 101, the personalizing engine 210 receives a query associated with a first user from a server, for example, the third-party server 142 or search server 140. In the instances where the users consent to the use of such data, the personalizing engine 210 retrieves results from other users that are connected to the first user in the social network generated by the social network engine 202. In instances where the matching module 103 is stored on the search server 140 or the third-party server 142, the personalizing engine 210 queries the social networks for search results associated with users, for example, through the user of an API. The personalizing engine 210 uses the search results to add a social element to a webpage.

For example, the search server 140 receives a query from a first user for webpages about yogurt shops in Mountain View. The search server 140 sends a query to the social network servers 101 for social content that relate to yogurt shops in Mountain View (e.g. posts, photos, videos, check-ins, ratings, etc.) from other users associated with the first user (e.g. other users that the first user follows or is friends with) who consented to the use of such data. For example, the first user might be more interested in visiting a yogurt shop that one of his connections visited and gave a high rating.

The graphical user interface engine 212 may be software including routines for generating a user interface that displays information for presentation to a user 125. In some instances, the graphical user interface engine 212 can be a set of instructions executable by the processor 235 to provide the functionality described below for generating the user interface. In other instances, the graphical user interface engine 212 is stored in the memory 237 of the computing device 200 and is accessible and executable by the processor 235. The graphical user interface engine 212 may be adapted for cooperation and communication with the processor 235 and other components of the computing device 200 via signal line 232.

Figure 3:
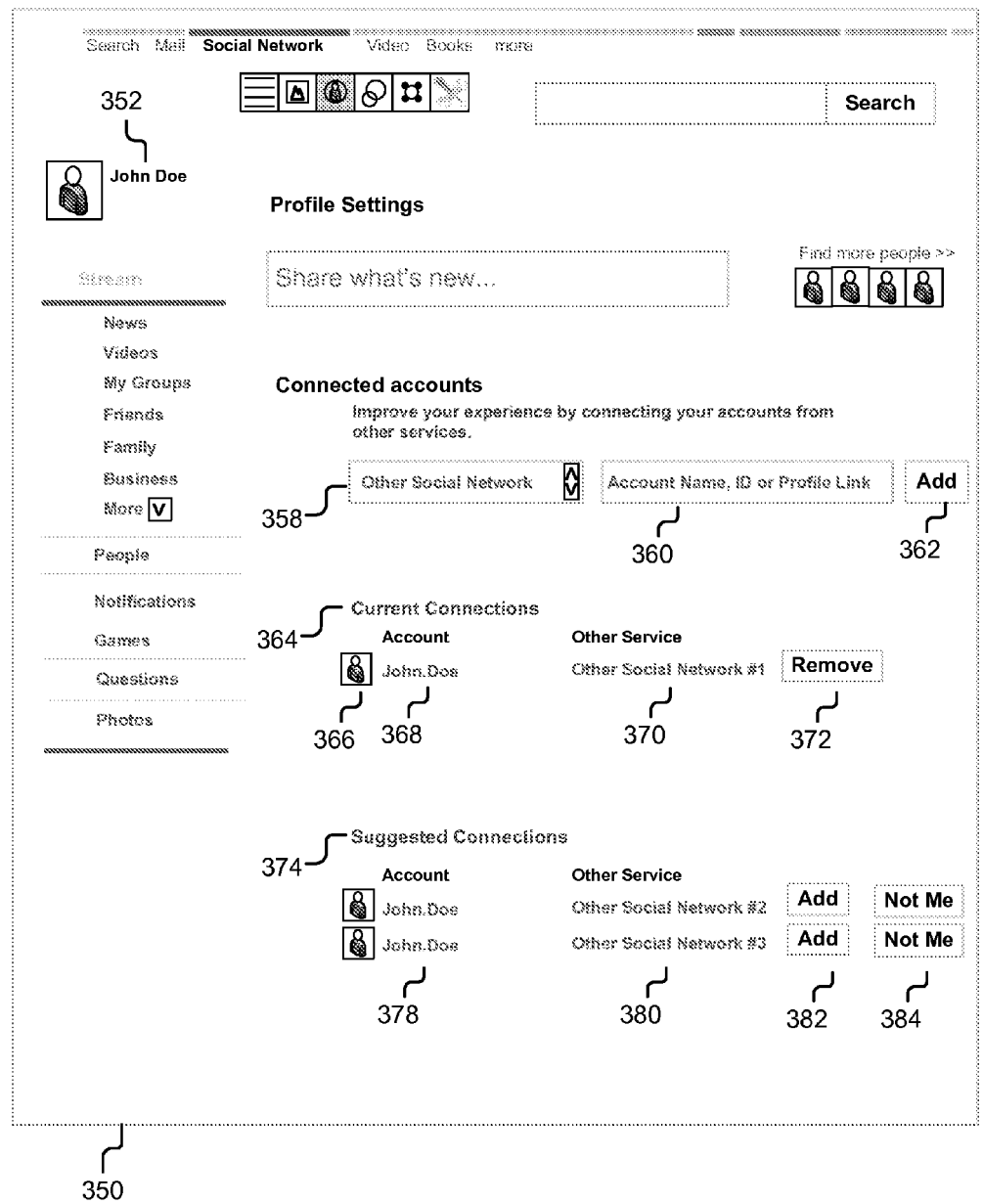
FIG. 3 is a graphic representation of an example user interface for managing known matching pairs for an account on a social network.

FIG. 3 is a graphic representation 350 of a user interface that is generated by the graphical user interface engine 212 for managing known matching pairs for an account 352 on a social network. The user interface provides inputs 358 and 360 for submitting an account on another social network that represents the same user 125 as account 352. By clicking the add button 362, linking information may be transmitted to the match determination module 208, which updates the known matches with the linking information. The linking information may include account information for both the social network and other social network. In one instance, the information may be stored in storage 243 or the social graph 110a.

The user interface may include a remove button 372 for removing a link between account 352 of the social network and another account 368 of another social network 370. The user interface may include a graphical representation 366 for the account 368. In one instance, the user interface includes suggested connections 374 to give the user the option of connecting with the account 352 of the social network. A suggestion may include a graphical representation of another account 378 of another social network 380 that the match determination module 208 identified as being likely associated with the user. The suggestion may include add button 382 for generating an explicit connection or link between the account 352 and another account 378 of another social network 380. In one instance, the suggestion includes a "not me" button 384 for reporting to the match determination module 208 that account 378 does not represent the same user 125 as account 352 of the social network. The match determination module 208 updates the known matches accordingly.

Figure 4A:
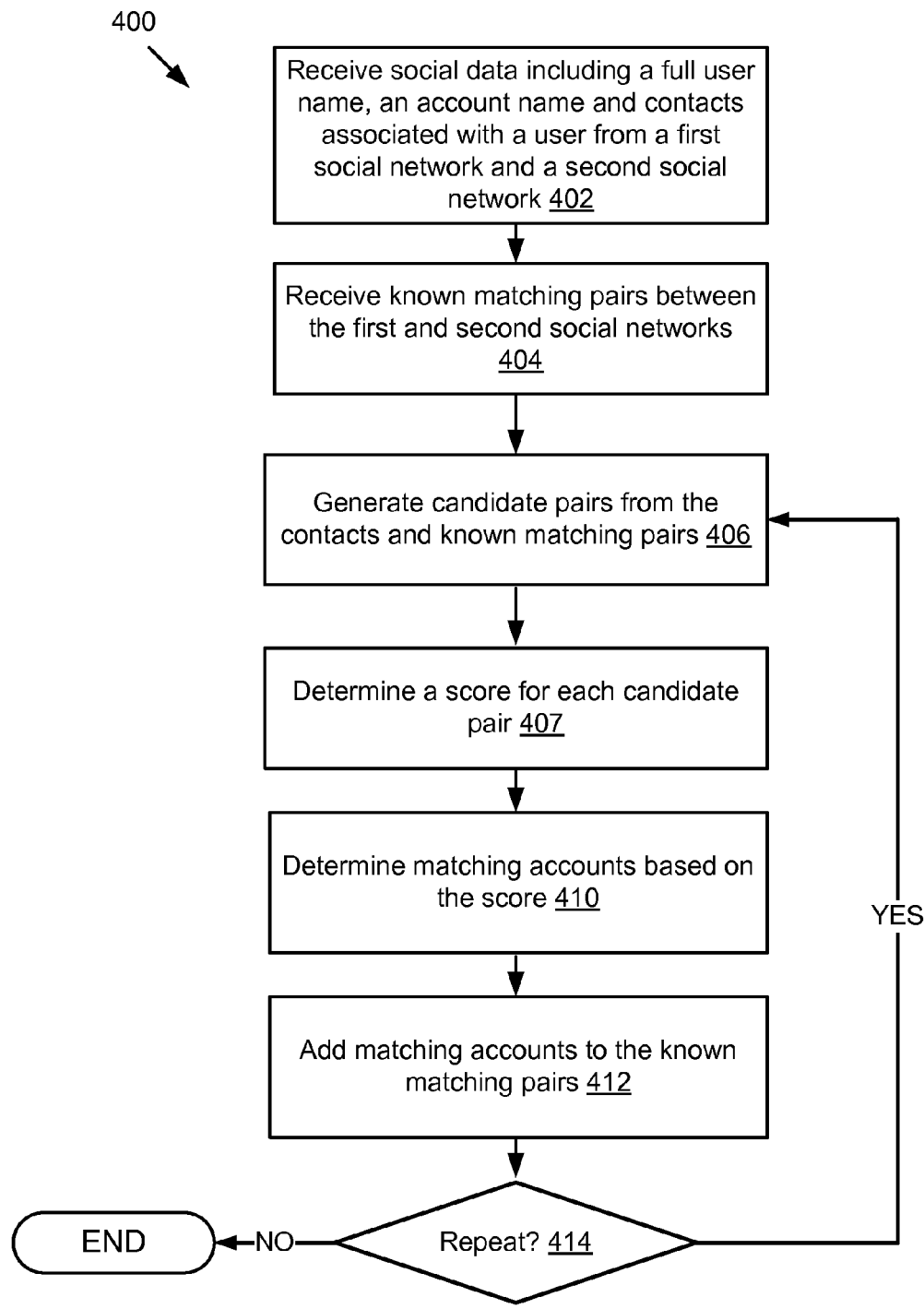
FIGS. 4A-4C are a flow diagram illustrating example methods for determining matching pairs between social networks.
Figure 4B:
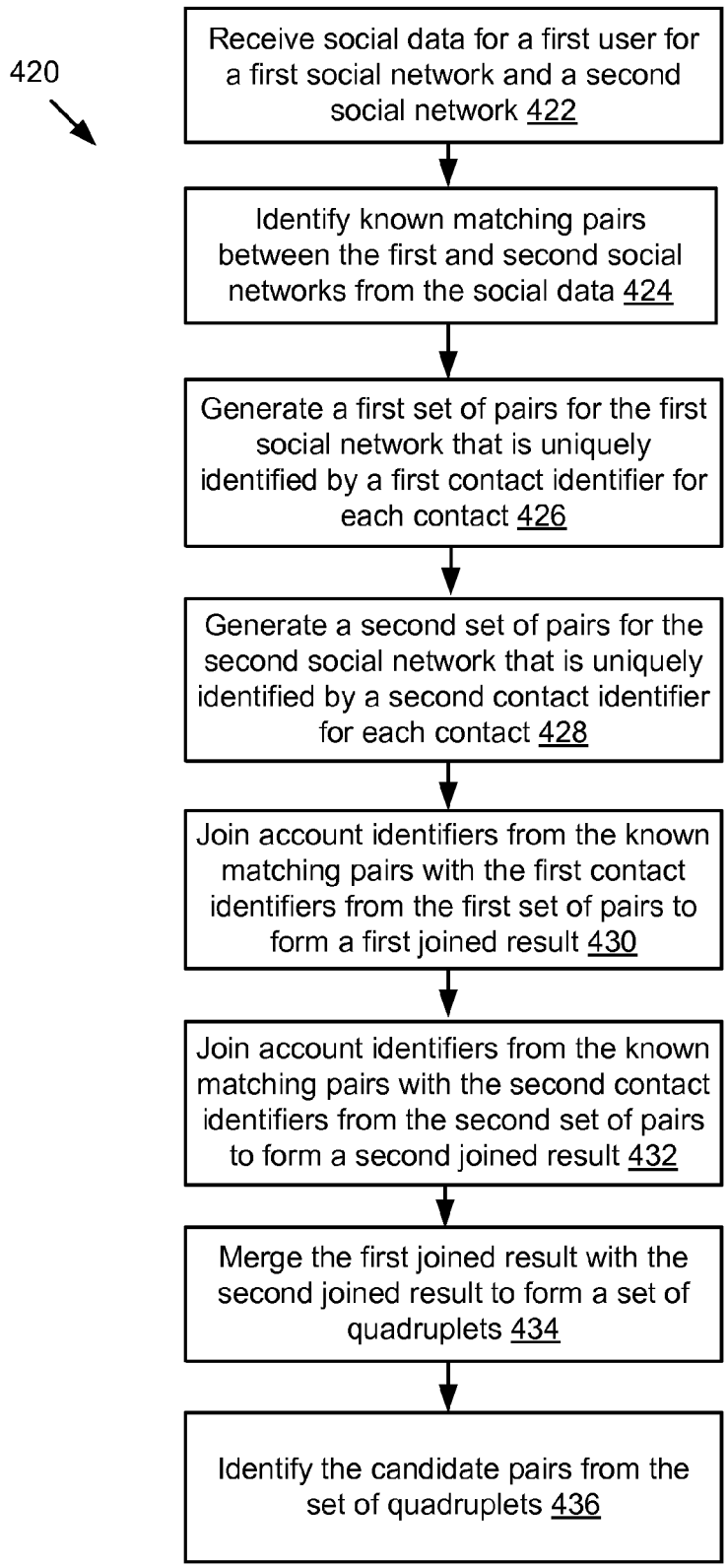
Figure 4C:
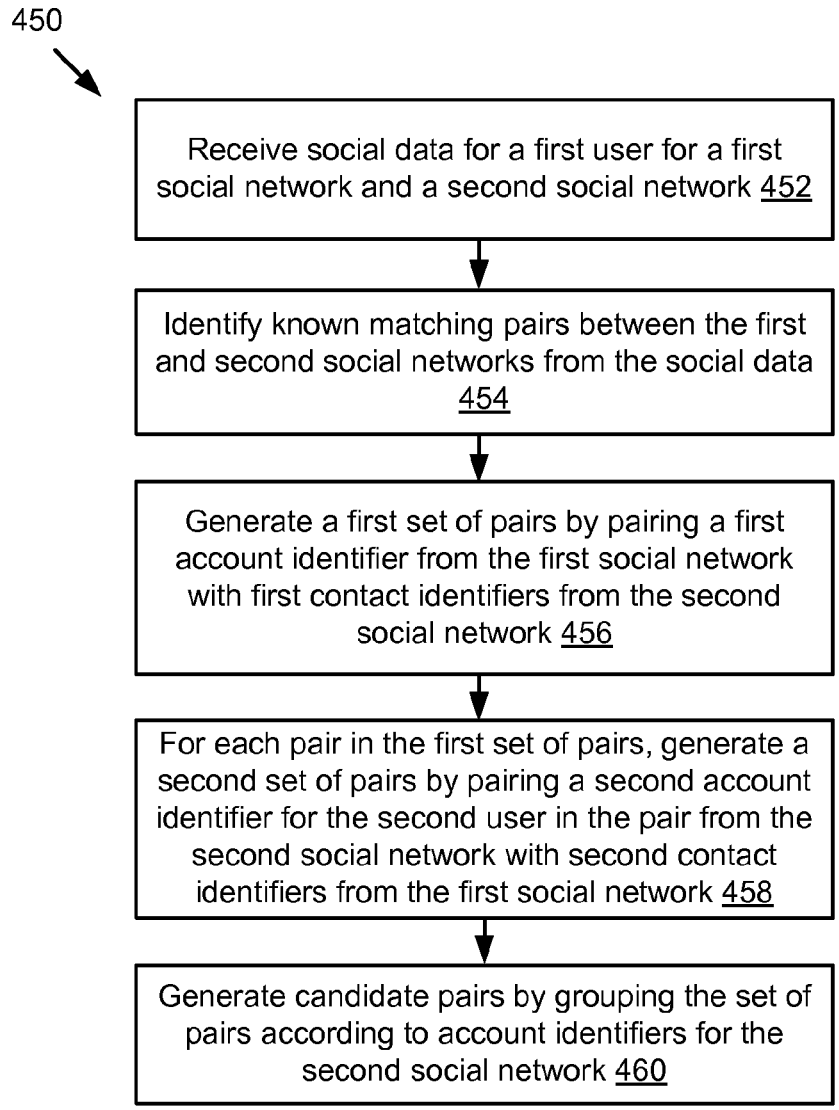

Referring now to FIGS. 4A-4C, various examples for identifying accounts in different social networks belonging to the same user will be described.

FIG. 4A is a flow diagram 400 of one instance of a method for determining matching pairs between social networks. A candidate pairing module 206 receives 402 social data including a full user name, an account name and contacts associated with a user from a first social network and a second network. The candidate pairing module 206 receives 404 known matching pairs between the first and second social networks.

In some instances, the candidate pairing module 206 may retrieve the known matching pairs from storage 243. In other instances, the candidate pairing module 206 may receive the known matching pairs from the account retrieval engine 204.

The candidate pairing module 206 generates 406 candidate pairs from the contacts and known matching pairs. A match determination module 208 determines 407 a score for the candidate pairs. The match determination module 208 determines 410 matching accounts based on the score and adds the matching accounts to the known matching pairs.

In one instance, the match determination module 208 determines the matching account by: (A) for each second social network account, the match determination module 208 identifies the candidate pairs containing the first social network account and selects the top N highest scored candidate pairs where N is a small number (e.g. one, two, or three), and discards all the other candidate pairs containing the second social network account; and (B) for each first social network account, the matching determination module 208 identifies the remaining candidate pairs containing the second social network account, and selects the top N highest scored candidate pairs where N is a small number.

In another instance, the match determination module 208 constructs a bipartite graph with nodes representing first social network accounts on one side and second social network accounts on the other side. There is an edge between node g on one side and node t on the other with a weight equal to the score for this pair of nodes. The matching determination module 208 computes a maximum weight bipartite matching in the graph, and outputs the resulting edges as known matching accounts.

The match determination module 208 adds 412 the matching accounts to the known matching pairs to generate a new set of known matching pairs. Then, the match determination module 208 determines 414 whether to find more matching accounts. In one instance, the match determination module 208 determines to find more matching accounts based on the scores for the matching accounts. If the match determination module 208 determines that more matching pairs should be found, then the method moves to step 406. Otherwise, the method ends.

Figure 5A:
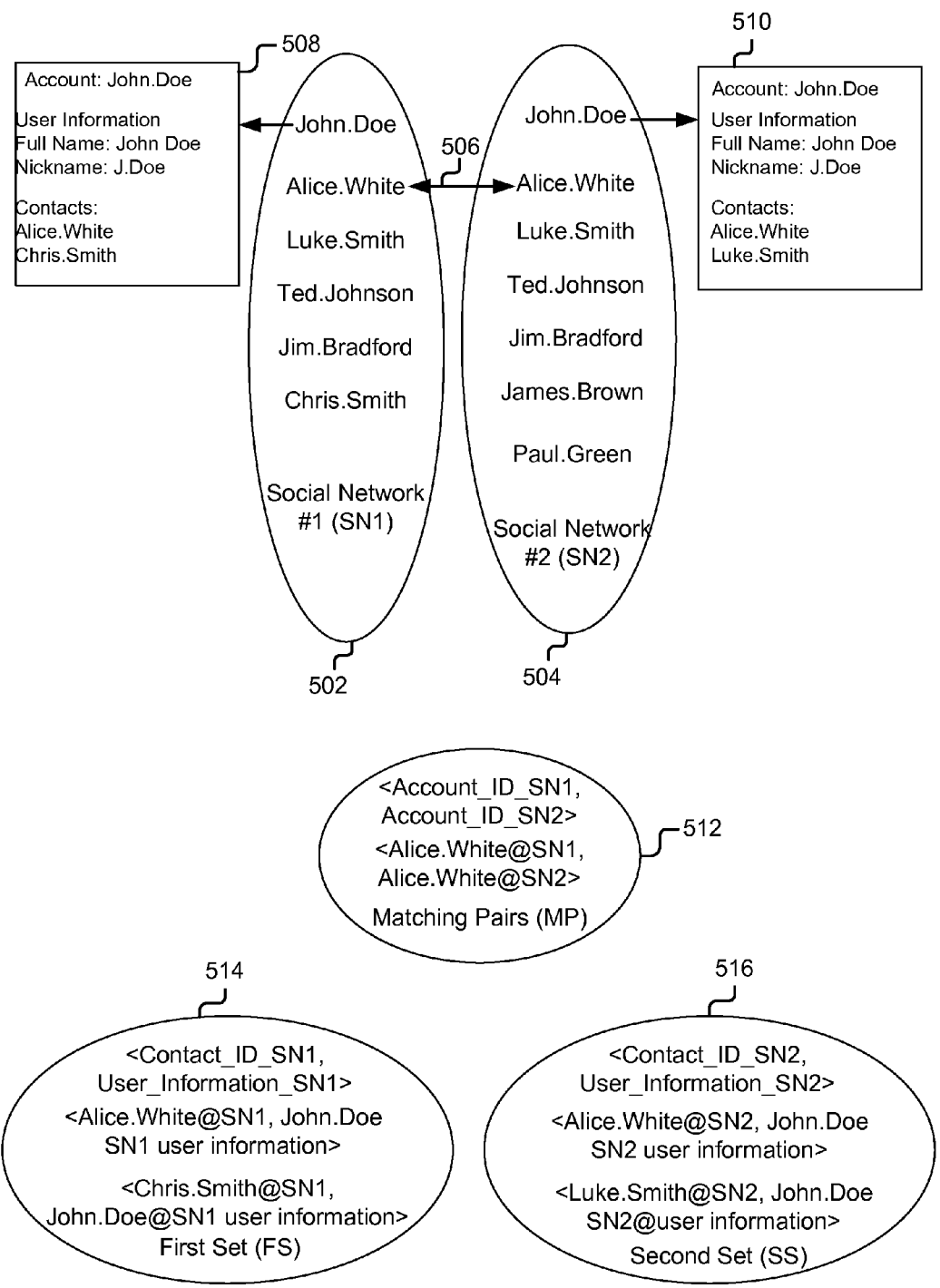
FIGS. 5A-5B illustrate an example of generating candidate pairs.
Figure 5B:
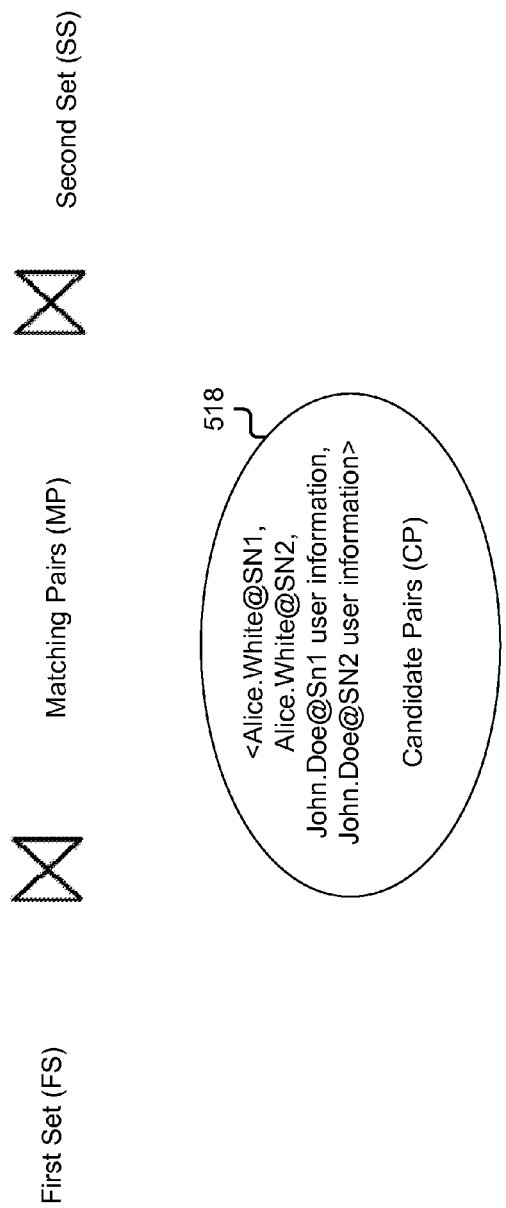

FIG. 4B is a flow diagram 420 of one instance of a method for generating candidate pairs between social networks. Thus, FIG. 4B can be viewed as describing specific method for performing step 406 in FIG. 4A. FIGS. 5A and 5B illustrate an example of the method of FIG. 4B as applied to specific social networks and will therefore be discussed in conjunction with FIG. 4B.

An account retrieval engine 204 receives 422 social data for a first user for a first social network and a second social network. In FIG. 5A, social data for the first social network (SN1) is included as a contact list for SN1 502 and account information for SN1 508. Social data for the second social network (SN2) is included as a contact list for SN2 504 and account information for SN2 510.

The account retrieval engine 204 identifies 424 known matching pairs between the first and second social networks from the social data. In this example, account information for SN1 508 includes an account identifier or user name, a full name, nickname and contacts for the user in the first social network. Account information for SN2 510 may have similar information on a second social network. The known matching pairs 512 include, for example, a pair of account identifiers for both social networks, such as a pair of email addresses for each social network. In FIG. 5A, a link 506 between illustrates a known matching pair that is included in a set of known matching pairs 512.

The account retrieval engine 204 transmits the known matching pairs to the candidate pairing module 206 or the candidate pairing module 206 retrieves the known matching pairs from storage 243. The candidate pairing module 206 generates 426 a first set of pairs for the first social network that is uniquely identified (e.g. keyed) by a first contact identifier for each contact. In this example, the first set of pairs 514 includes the contact ID for the first contact on the first social network and the user information for the user (<Contact_ID_SN1, User_Information_SN1>) is the email address for Alice White on the second social network and the user information for John Doe (<Alice.White@SN1, John.Doe@SN1 user information>). The first set of pairs 514 also includes the contact ID for the second contact Chris Smith on the first social network and the user information for the user (<Chris.Smith@SN1, John.Doe@SN1 user information>).

The candidate pairing module 206 generates 428 a second set of pairs for the second social network that is uniquely identified (e.g. keyed) by a second contact identifier for each contact. In this example, the set of pairs 516 the contact ID for the first contact on the second social network and the user information for the user (<Contact_ID_SN2, User_Information_SN2>) is the email address for Alice White on the second social network and the user information for John Doe (<Alice.White@SN2, John.Doe@SN2 user information>). The second set of pairs 516 also includes the contact ID for the second contact Luke Smith on the second social network and the user information for the user (<Luke.Smith@SN2, John.Doe@SN2 user information>).

The candidate pairing module 206 joins 430 account identifiers from the known matching pairs with the first contact identifiers from the first set of pairs to form a first joined result. The candidate pairing module 206 joins 432 the account identifiers from the known matching pairs with the second contact identifiers from the second set of pairs to form a second joined result. The candidate pairing module 206 merges 434 the first joined result with the second joined result to form a set of quadruplets and identifies 436 the candidate pairs from the set of quadruplets.

FIG. 5B illustrates a merge that includes performing a join on known matching pairs 512, the first set of pairs 514 and the second set of pairs 516. In the example, a first join between the first set 514 and the known matching pairs 512 is performed by matching the contacts in the first set 514 with accounts from the first social network included in the known matching pairs 512. The first joined result is a join on Alice.White@SN1. A second join between the second set 516 and results from the first join is performed by matching the contacts in the second set 516 with accounts from the second social network included in the first join which originate from the known matching pairs 512. The second joined result is a join on Alice.White@SN2. Data from the first and second join may include four items of information that may include the contact from the first social network, the contact from second social network, user information 508 for an account on the first social network and user information 510 for an account on a second social network.

A candidate pair may be generated by pairing the user information 508 for an account on the first social network and user information 510 for an account on a second social network from the join results. In this example, account John.Doe of the first social network and account John.Doe of the second social network are paired based on Alice.White being included in the known matching pairs 512 and being a contact of both accounts. By merging the first joined result with the second joined result, the quadruplet 518 is <Alice.White@SN1, Alice.White@SN2, John.Doe@SN1 user information, John.Doe@SN2 user information>. The candidate pair containing the two John Doe accounts is identified in the quadruplet 518.

Figure 6A:
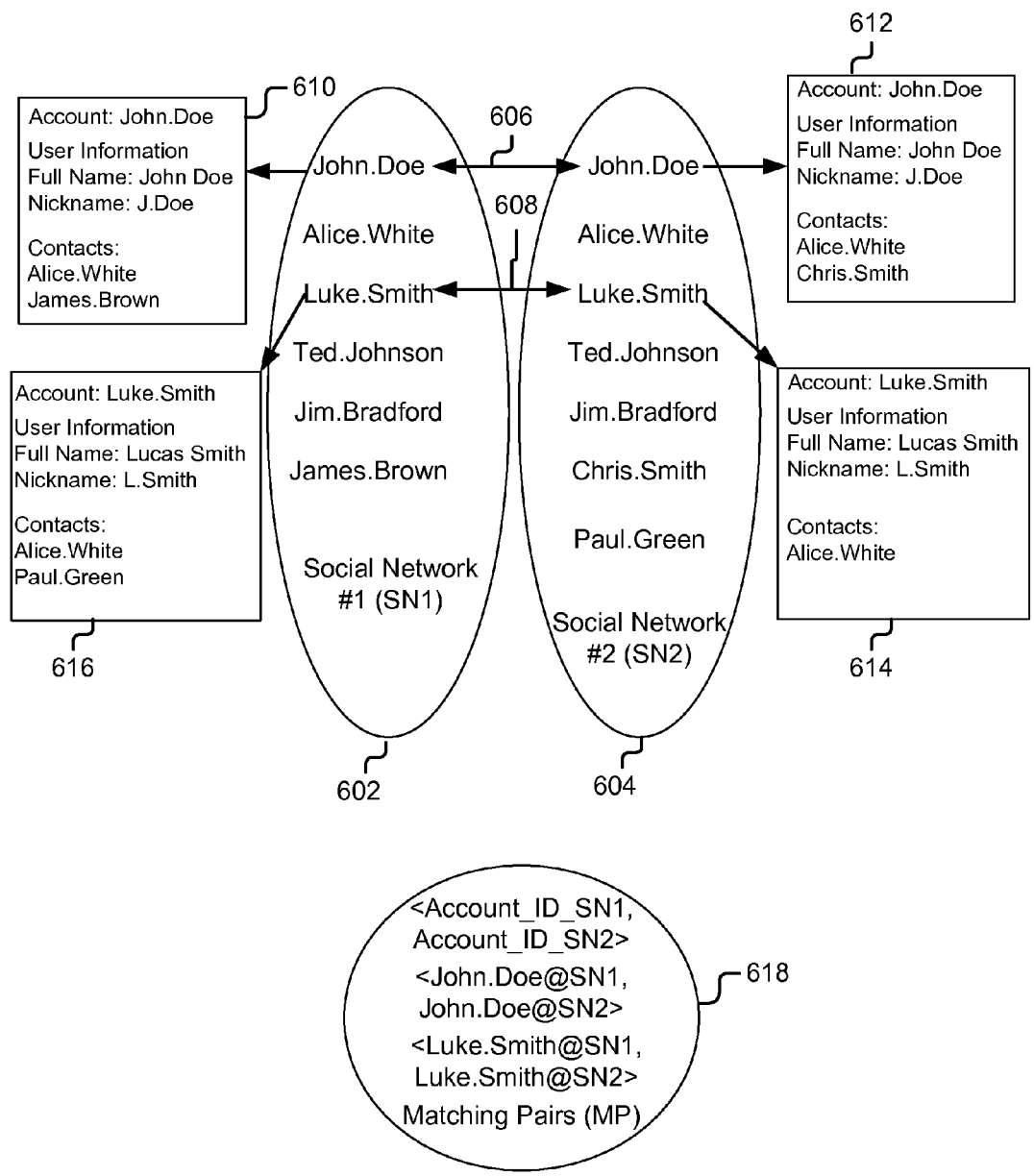
FIGS. 6A-6B illustrate an example of generating candidate pairs.
Figure 6B:
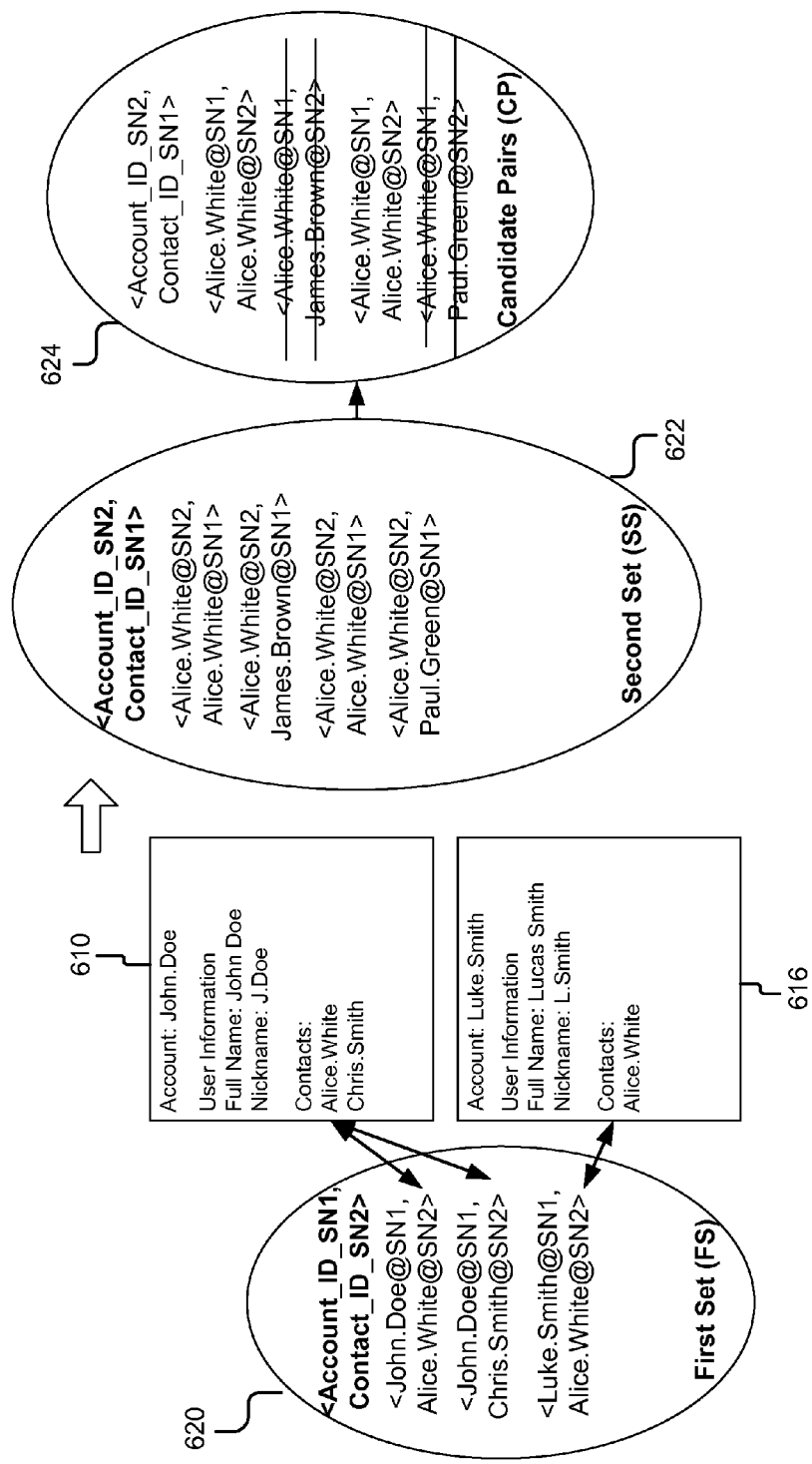

FIG. 4C is a flow diagram 450 of another instance of a method for generating candidate pairs between social networks. FIG. 4B as applied to specific FIGS. 6A and 6B illustrate an example of FIG. 4C as applied to specific social networks. A candidate pairing module 206 receives 452 social data for a first user for a first social network and a second social network. In FIG. 6A, social data in the first social network (SN1) is included as a user contact list for SN1 602, John Doe account information for SN1 610 and Luke Smith account information for SN1 616. Social data for users in the second social network (SN2) is included as a contact list for SN2 604, John Doe account information for SN2 612 and Luke Smith account information 614. In this example, account information 610, 616, 612 and 614 includes an account identifier or user name, a full name, nickname and contacts.

The candidate pairing module 206 identifies 454 known matching pairs between the first and second social networks from the social data. For example, in FIG. 6A John Doe and Luke Smith have known matching pairs between SN1 and SN2. Links 606 and 608 between user contact lists 602 and 604 illustrate the connections. For example, the known matching pairs 618 include account identifiers for the matching pairs in the social networks (<Account_ID_SN1, Account_ID_SN2>). Using the example of John.Doe and Luke.Smith the account identifiers include <John.Doe@SN1, John.Doe@SN2> and <Luke.Smith@SN1, Luke. Smith@SN2>.

The candidate pairing module 206 generates 456 a first set of pairs by pairing a first account identifier from the first social network with first contact identifiers from the second social network (<Account_ID_SN1, Contact_ID_SN2>). For example, John Doe from the first social network has two contacts from the second social network: Alice.White and Chris.Smith. The candidate pairing module 206 generates a first set of pairs including Alice.White and Chris.Smith (<John.Doe@SN1, Alice.White@SN2>, <John.Doe@SN1, Chris.Smith@SN2>). Similarly, if Luke.Smith from the first social network has a known matching pair with Luke.Smith in the second social network, and Luke.Smith has Alice.White in the second social network as a contact, the candidate pairing module 206 generates a pair as <Luke.Smith@SN1, Alice.White@SN2>.

For each pair in the first set of pairs, the candidate pairing module 206 generates 458 a second set of pairs by pairing a second account identifier for the second user in the pair from the second social network with second contact identifiers from the first social network (<Account_ID_SN2, Contact_ID_SN1>). In FIG. 6B, for example, in the first set 620, John Doe from the first social network is paired with Alice.White from the second social network. In the first social network, account 610 for John.Doe has contacts Alice.White and James.Brown. As a result, contact Alice.White from the second social network is paired with contacts Alice.White and James.Brown from the first social network and included in the second set 622 (<Alice.White@SN2, Alice.White@SN1>, <Alice.White@SN2, James.Brown@SN1>). Similarly, Luke.Smith had the pair <Luke.Smith@SN1, Alice.White@SN2> in the previous step. If in the first social network, Luke.Smith has contacts Alice.White@SN1 and Paul.Green@SN1, the candidate pairing module 206 generates <Alice.White@SN2, Alice.White@SN1> and <Alice.White@SN2, Paul.Green@SN1>.

After this stage, the candidate pairing module 206 has three distinct pairs containing Alice.White@SN2. The pairs contain the first social network identifiers Alice.White@SN1, James.Brown@SN1 and Paul.Green@SN1. This means that Alice.White@SN1, James.Brown@SN1 and Paul.Green@SN1 are candidate matching pairs for Alice.White@SN2. In this case, one of these is a candidate corresponding to a true known matching pair (and thus will have a high score in step 407 of FIG. 4A), and two are candidates corresponding to different user accounts (and thus will have low scores in step 407 of FIG. 4A). A key property of the steps in FIG. 4C is that it is possible to have many copies of the same pair of <SN2 ID, SN1 ID>. In fact, the number of copies of a pair is equal to the number of known matching links between the respective contacts of a given <SN2 ID, SN1 ID> pair. In this example, the two Alice White accounts had two contacts in common: John Doe and Luke Smith.

The candidate pairing module 206 generates 460 the candidate pairs 624 for Alice by grouping the set of pairs according to account identifiers for the second social network. In the FIG. 6B, the candidate pairing module 206 determines that there are two copies of Alice.White@SN1 associated with the Alice.White@SN2, one copy of the James.Brown@SN1 and one copy of the Luke.Smith@SN1. Thus, Alice.White@SN1 is more likely to be the true known matching link.

In some instances, pairs that appear infrequently are deleted or not considered as candidate pairs. In the example, the pairs <Alice.White@SN1, James.Brown@SN2> and <Alice.White@SN1, Paul.Green@SN2> are deleted because there is only one occurrence of that particular pair.

In the above description, for purposes of explanation, numerous specific details are set forth in order to provide a thorough understanding of the specification. It will be apparent, however, to one skilled in the art that the disclosure can be practiced without these specific details. In other instances, structures and devices are shown in block diagram form in order to avoid obscuring the description. For example, the disclosure is described in one instance primarily with reference to user interfaces and particular hardware. However, the disclosure applies to any type of computing device that can receive data and commands, and any peripheral devices providing services.

Reference in the specification to "one instance" or "an instance" means that a particular feature, structure, or characteristic described in connection with the instance is included in at least one instance of the description. The appearances of the phrase "in one instance" in various places in the specification are not necessarily all referring to the same instance.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware instance, an entirely software instance or an instance containing both hardware and software elements. In a preferred instance, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description above. In addition, the specification is not described with reference to any particular programming language. It will be appreciated that a variety of programming languages may be used to implement the teachings of the specification as described herein.

The foregoing description of the instances of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:
   receiving, with one or more computing devices, social data associated with a first user from a first social network and from a second social network, the social data including the first user's contacts and known matching pairs between the first and second social networks, wherein the known matching pairs are known pairs of account identifiers that may represent same users;
   generating, with the one or more computing devices, first candidate pairs from the contacts and the known matching pairs;
   determining, with the one or more computing devices, a first score for each of the first candidate pairs;
   determining, with the one or more computing devices, first matching accounts from the first candidate pairs based on the first score;
   adding, with the one or more computing devices, the first matching accounts to the known matching pairs;
   generating, with the one or more computing devices, second candidate pairs from the contacts and the known matching pairs, subsequent to adding the first matching accounts to the known matching pairs;
   determining, with the one or more computing devices, a second score for each of the second candidate pairs;
   determining, with the one or more computing devices, second matching accounts from the second candidate pairs based on the second score;
   adding, with the one or more computing devices, the second matching accounts to the known matching pairs until a number of matching accounts falls below a threshold; and
   generating, with the one or more computing devices, a suggestion for the first user to create an explicit connection between matching accounts included in the known matching pairs.

2. The method of claim 1, wherein generating the first candidate pairs further comprises:
   generating a first set of pairs for the first social network that is uniquely identified by a first contact identifier for each contact;
   generating a second set of pairs for the second social network that is uniquely identified by a second contact identifier for each contact;
   joining account identifiers from the known matching pairs with the first contact identifiers from the first set of pairs to form a first joined result;
   joining account identifiers from the known matching pairs with the second contact identifiers from the second set of pairs to form a second joined result;
   merging the first joined result with the second joined result to form a set of quadruplets; and
   identifying the first candidate pairs from the set of quadruplets.

3. The method of claim 1, wherein generating the first candidate pairs further comprises:
   generating a first set of pairs by pairing a first account identifier from the first social network with first contact identifiers from the second social network based at least on the known matching pairs;
   for each pair in the first set of pairs, generating a second set of pairs by pairing a second account identifier for a second user in the pair from the second social network with second contact identifiers from the first social network; and
   generating the first candidate pairs by grouping the second set of pairs according to account identifiers for the second social network.

4. The method of claim 1, wherein determining the first matching accounts further comprises:
   for each second social network account, identifying the candidate pairs containing a first social network account and selecting a top N highest scored first candidate pairs;
   discarding all the other candidate pairs containing a second social network account;
   for each first social network account identifying the remaining first candidate pairs containing the second social network account; and
   selecting the top N highest scored first candidate pairs.

5. The method of claim 1, wherein determining the first matching accounts further comprises:
   constructing a bipartite graph with nodes representing first social network accounts on a first side and second social network accounts on a second side;
   computing a maximum weight bipartite matching in the bipartite graph; and
   identifying edges resulting from the maximum weight as known matching accounts.

6. The method of claim 1, further comprising:
   identifying that the first user is connected to a second user in the first social network; and generating a suggestion for the first user to create a connection with the second user in the second social network based on the known matching pairs.

7. The method of claim 1, further comprising generating a suggestion for the first user associated with the first social network to associate the second social network with the first social network.

8. The method of claim 1, further comprising:
receiving a query associated with the first user from a server;
retrieving search results from other users that are connected to the first user in the first and second social networks; and
transmitting the search results to the server, wherein the server associates the search results with content generated by the server.

9. The method of claim 8, wherein the search results are webpages that match the query.

10. The method of claim 1, wherein the social data includes user profile information for each candidate and wherein the first score is based on a similarity of user profile information in the first and second social networks.

11. A system comprising:
one or more processors;
a memory storing instructions that, when executed, cause the system to:
receive social data associated with a first user from a first social network and from a second social network, the social data including the first user's contacts and known matching pairs between the first and second social networks, wherein the known matching pairs are known pairs of account identifiers that may represent same users;
generate first candidate pairs from the contacts and the known matching pairs;
determine a first score for each of the first candidate pairs;
determine first matching accounts from the first candidate pairs based on the first score;
add the first matching accounts to the known matching pairs;
generate second candidate pairs from the contacts and the known matching pairs, subsequent to adding the first matching accounts to the known matching pairs;
determine a second score for each of the second candidate pairs;
determine second matching accounts from the second candidate pairs based on the second score;
add the second matching accounts to the known matching pairs until a number of matching accounts falls below a threshold; and
generate a suggestion for the first user to create an explicit connection between matching accounts included in the known matching pairs.

12. The system of claim 11, wherein generating the first candidate pairs further comprises:
generating a first set of pairs for the first social network that is uniquely identified by a first contact identifier for each contact;
generating a second set of pairs for the second social network that is uniquely identified by a second contact identifier for each contact;
joining account identifiers from the known matching pairs with the first contact identifiers from the first set of pairs to form a first joined result;
joining account identifiers from the known matching pairs with the second contact identifiers from the second set of pairs to form a second joined result;
merging the first joined result with the second joined result to form a set of quadruplets; and
identifying the first candidate pairs from the set of quadruplets.

13. The system of claim 11, wherein generating the first candidate pairs further comprises:
generating a first set of pairs by pairing a first account identifier from the first social network with first contact identifiers from the second social network based at least on the known matching pairs;
for each pair in the first set of pairs, generating a second set of pairs by pairing a second account identifier for a second user in the pair from the second social network with second contact identifiers from the first social network; and
generating the first candidate pairs by grouping the second set of pairs according to account identifiers for the second social network.

14. The system of claim 11, wherein determining the first matching accounts further comprises:
for each second social network account, identifying the candidate pairs containing a first social network account and selecting a top N highest scored first candidate pairs;
discarding all the other candidate pairs containing a second social network account;
for each first social network account identifying the remaining first candidate pairs containing the second social network account; and
selecting the top N highest scored first candidate pairs.

15. The system of claim 11, wherein determining the first matching accounts further comprises:
constructing a bipartite graph with nodes representing first social network accounts on a first side and second social network accounts on a second side;
computing a maximum weight bipartite matching in the bipartite graph; and
identifying edges resulting from the maximum weight as known matching accounts.

16. A computer program product comprising a non-transitory computer usable medium including a computer readable program, wherein the computer readable program when executed on a computer causes the computer to:
receive social data associated with a first user from a first social network and from a second social network, the social data including the first user's contacts and known matching pairs between the first and second social networks, wherein the known matching pairs are known pairs of account identifiers that may represent same users;
generate first candidate pairs from the contacts and the known matching pairs;
determine a first score for each candidate pair;
determine first matching accounts from the candidate pairs based on the first score;
add the first matching accounts to the known matching pairs;
generate second candidate pairs from the contacts and the known matching pairs, subsequent to adding the first matching accounts to the known matching pairs;
determine a second score for each of the second candidate pairs;
determine second matching accounts from the second candidate pairs based on the second score;

add the second matching accounts to the known matching pairs until a number of matching accounts falls below a threshold; and generate a suggestion for the first user to create an explicit connection between matching accounts included in the known matching pairs.

17. The computer program product of claim 16, wherein generating the first candidate pairs further comprises:

generating a first set of pairs for the first social network that is uniquely identified by a first contact identifier for each contact;

generating a second set of pairs for the second social network that is uniquely identified by a second contact identifier for each contact;

joining account identifiers from the known matching pairs with the first contact identifiers from the first set of pairs to form a first joined result;

joining account identifiers from the known matching pairs with the second contact identifiers from the second set of pairs to form a second joined result;

merging the first joined result with the second joined result to form a set of quadruplets; and identifying the first candidate pairs from the set of quadruplets.

18. The computer program product of claim 16, wherein generating the first candidate pairs further comprises:

generating a first set of pairs by pairing a first account identifier from the first social network with first contact identifiers from the second social network based at least on the known matching pairs;

for each pair in the first set of pairs, generating a second set of pairs by pairing a second account identifier for a second user in the pair from the second social network with second contact identifiers from the first social network; and generating the first candidate pairs by grouping the second set of pairs according to account identifiers for the second social network.

19. The computer program product of claim 16, wherein determining the first matching accounts further comprises:

for each second social network account, identifying the candidate pairs containing a first social network account and selecting a top N highest scored first candidate pairs;

discarding all the other candidate pairs containing a second social network account;

for each first social network account identifying the remaining first candidate pairs containing the second social network account; and selecting the top N highest scored first candidate pairs.

20. The computer program product of claim 16, wherein determining the first matching accounts further comprises:

constructing a bipartite graph with nodes representing first social network accounts on a first side and second social network accounts on a second side;

computing a maximum weight bipartite matching in the bipartite graph; and identifying edges resulting from the maximum weight as known matching pairs.

\* \* \* \* \*